(12) United States Patent
Machir et al.

(10) Patent No.: US 10,436,664 B2
(45) Date of Patent: Oct. 8, 2019

(54) MICRO FLEXIBLE FORCE SENSOR

(71) Applicant: Honeywell International Inc., Morris Plains, NJ (US)

(72) Inventors: James F. Machir, Columbus, OH (US); Richard Wade, Worthington, OH (US); Jason Dennis Patch, Columbus, OH (US)

(73) Assignee: Honeywell International Inc., Morris Plains, NJ (US)

( * ) Notice: Subject to any disclaimer, the term of this patent is extended or adjusted under 35 U.S.C. 154(b) by 86 days.

(21) Appl. No.: 15/604,194

(22) Filed: May 24, 2017

(65) Prior Publication Data

US 2018/0340855 A1    Nov. 29, 2018

(51) Int. Cl.
*G01L 25/00*     (2006.01)
*G01L 19/14*     (2006.01)
(Continued)

(52) U.S. Cl.
CPC .......... *G01L 19/141* (2013.01); *G01L 5/0004* (2013.01); *G01L 5/0038* (2013.01);
(Continued)

(58) Field of Classification Search
CPC ............... G01L 19/141; G01L 19/0069; G01L 19/0627; G01L 5/0004; G01L 5/0038;
(Continued)

(56) References Cited

U.S. PATENT DOCUMENTS 5,760,313 A    6/1998  Guentner et al.
8,091,436 B2 * 1/2012  Eckhardt ................. A61M 5/14
                                                     604/505
(Continued)

FOREIGN PATENT DOCUMENTS

WO    2007017301 A1    2/2007
WO    20150065639 A1   5/2017

OTHER PUBLICATIONS

Richard Macary and Richard Hamilton, SelectConnect™ Process for Metallizing Circuits on Molded Parts and Components; Mar. 8, 2010; 5 pages.

(Continued)

*Primary Examiner* — Harshad R Patel
*Assistant Examiner* — Nigel H Plumb
(74) *Attorney, Agent, or Firm* — Seager Tufte & Wickhem LLP

(57) ABSTRACT

Embodiments relate generally to a sensor device, method, and system are provided for housing a sensor. An example force sensor includes an actuation element, a sense die, and a universal housing for holding a sense die. The universal housing has a top wall, a bottom wall, two side walls, and a back wall that define a cavity. The sense die is disposed within the cavity. The top wall defines an aperture having a first central axis therethrough. The housing defines an opening between the top wall and bottom wall extending from an exterior of the housing to the cavity. The opening has a second central axis and is configured to receive the sense die therethrough. At least a portion of the actuation element extends from the cavity through the aperture. The first central axis is orthogonal to the second central axis.

20 Claims, 2 Drawing Sheets

(51) Int. Cl.
*G01L 5/00* (2006.01)
*G01L 9/00* (2006.01)
*G01L 19/00* (2006.01)
*G01L 19/06* (2006.01)
*B29C 45/14* (2006.01)
*B29K 705/00* (2006.01)
*B29L 31/36* (2006.01)

(52) U.S. Cl.
CPC ........ *G01L 9/0052* (2013.01); *G01L 19/0069* (2013.01); *G01L 19/0627* (2013.01); *B29C 45/14336* (2013.01); *B29K 2705/00* (2013.01); *B29L 2031/36* (2013.01)

(58) Field of Classification Search
CPC ........... G01L 9/0052; G01L 1/18; G01L 1/26; G01B 7/16; G01F 1/37; B29C 45/14336; B29K 2705/00; B29L 2031/36; H01L 21/4842; H01L 23/02
See application file for complete search history.

(56) References Cited

U.S. PATENT DOCUMENTS

| | | | | |
|---|---|---|---|---|
| 8,327,715 | B2* | 12/2012 | Bradley | ............... G01L 1/18 73/774 |
| 9,003,897 | B2* | 4/2015 | Wade | .............. G01L 1/26 73/862.621 |
| 2005/0046016 | A1* | 3/2005 | Gilleo | ............ H01L 23/055 257/713 |
| 2007/0251328 | A1 | 11/2007 | Selvan et al. | |
| 2013/0124768 | A1 | 9/2013 | Thanigachalam et al. | |
| 2013/0298688 | A1 | 11/2013 | Wade et al. | |
| 2015/0062837 | A1* | 3/2015 | Greiner | ........... H01L 21/4842 361/748 |
| 2016/0273977 | A1* | 9/2016 | Wade | ............. G01L 19/0618 |

OTHER PUBLICATIONS

Xilinx Inc.; Xilinx Advanced Packaging; 2004; 12 pages.
Extended European Search Report, EP18171960.0, 8 pp., dated Sep. 6, 2018.

* cited by examiner

US 10,436,664 B2

MICRO FLEXIBLE FORCE SENSOR

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD

The present disclosure relates generally to force sensors, and more particularly, to force sensors for sensing a force applied to the sensors.

BACKGROUND

In many industrial areas it may be necessary to measure the magnitude of a force. Typically, force sensors may be used to sense the force applied to the sensors and provide an output signal representative of the applied force. Various force sensor designs can be used and can rely on a displacement of a component (e.g. stress-field applied to a stress-sensitive element) to measure the presence of a force and/or an amount of the force applied on the sensor. Force sensors may be used in a wide variety of applications, such as medical applications, military applications, handheld/portable device applications, flight control applications, weather monitoring applications, industrial process applications, as well as many other applications.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
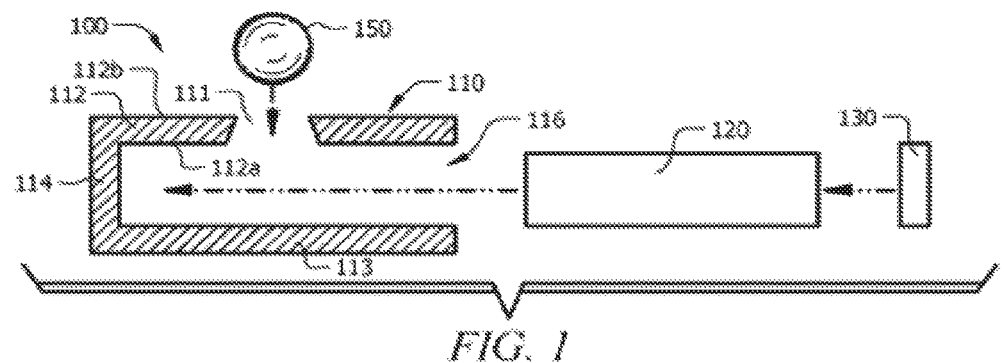
FIG. 1 illustrates a schematic of an exemplary embodiment of a force sensor assembly comprising an actuation element, a universal housing, a sense die, and a plug.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field (for example, +/−10%); and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The embodiments of this disclosure typically relate to sensors, and more specifically, to force sensors for sensing the magnitude of a force. Typically, force sensors may be used to sense the force applied to the sensors and provide an output signal representative of the applied force. Force sensors may be used in a wide variety of applications, such as medical applications, military applications, handheld/portable device applications, flight control applications, weather monitoring applications, industrial process applications, as well as many other applications. Generally, various force sensor designs may be used and may rely on a displacement of a component (e.g. stress-field applied to a stress-sensitive element) to measure the presence of a force and/or an amount of the force applied on the sensor.

Conventionally, force sensor assemblies may comprise a sense die coupled to a lead frame. The sense die may typically be mounted on the lead frame using an adhesive, solder, or the like. Additionally, a plurality of electrical connections or leads may be electrically coupled through the lead frame through one or more bonds, such as wire bonds, to the sense die. The lead frame may comprise a plurality of output connector pins or leads which may be used to connect the force sensor to an external device or system. Thus, the leads typically comprise an electrically conductive material (e.g. gold, copper, aluminum, tin, silver, platinum, or any other suitably conductive material) for conducting a signal between the sense die and an external electrical connection.

Typically, depending on the application, force sensors may comprise a unique terminal location/electrical interface. Thus, conventional terminal lead frames may be over molded into, for example, plastic to fit the Customer's unique application. Over molding lead frames may raise costs, and, in some cases, may raise concerns about the repeatability of the process. Additionally, every time a change in the electrical point of contact may be needed to fit the Customer's unique application, a new terminal may need to be designed and tooled, and a new injection molding tool may need to be designed and fabricated. Typically, a new terminal tool and a new injection molding tool required for each unique application may cost the Customer time (e.g. 6-8 weeks) and money (e.g. approximately $10,000). This may limit flexibility and may require multiple part numbers to be carried. Generally, this may be acceptable for large, single order customers (e.g. in the multi-million unit per year market), but it may not be acceptable for general sales.

Thus, disclosed herein are force sensors having a common/universal molded housing/pocket. Typically, the common/universal molded housing/pocket may be created by injection molding (e.g., micromolding) and may allow electrical connections for each Customer's specific application to occur after the molding operation. This may eliminate the need for multiple terminal designs and multiple over-molded tool designs from being constructed. Additionally, this concept may allow standard diaphragm based dies to be used as well as slab dies. Typically, the common/universal molded housing/pocket may make use of selective plating technology for selective plating (e.g., laser plating) of metal traces directly onto the housing. In some embodiments, multiple common electrical post connections (e.g., two, three, or four or more electrical connections) may be insert molded onto the housing. This may allow the sense die to be inserted into the housing, and the metal traces may be applied onto the housing in any size/shape to fit the Customer's application.

Additionally, the use of a common/universal molded housing/pocket may eliminate the need for wire bonds. Typically, the electrical connections between the sense die and the housing may be mechanical connections eliminating the need for bonds, such as wire bonds or solder bonds. Wire bonds may require more manufacturing time, may require protection from environmental factors (e.g. dust, debris, etc.), and may cause the force sensor assembly to be larger in order to properly protect the wire bonds. Thus, without the need for wire bonds, the force sensor package may be only slightly larger than the sense die (e.g. 0.25 mm thickness of the housing walls), and the sense die may be tightly controlled dimensionally (e.g. ±13 µm). In some embodiments, the conventional sense die may be modified to increase the size or change the shape of the electrical connections (e.g. bond pads, etc.) to allow more tolerance for a mechanical connection between the housing and the sense die.

Turning now to the drawings, FIG. 1 illustrates a schematic of an exemplary embodiment of a force sensor assembly 100 comprising an actuation element 150, a housing 110, a sense die 120, and a plug 130. Typically, the housing 110 may be configured to fit any standard sense die and may function as a pocket for the sense die 120. As shown in the exemplary embodiment of FIG. 1, the housing 110 may comprise multiple (e.g., up to five) faces. Typically, one side of the housing 110 may remain open to allow insertion of the sense die 120 into the cavity 116 of the housing 110. In some embodiments, the housing 110 may be formed by injection molding to allow for the addition of electrical connections to the housing 110. In the exemplary embodiment of FIG. 1, the housing 110 may comprise walls with a thickness of approximately 0.25 millimeters. However, in some embodiments, the thickness of the housing walls may vary. In most cases, the housing 110 may be formed such that it may snugly encompass the sense die 120 (e.g. mechanical connection between the housing 110 and the sense die 120). In some embodiments, for example, solder balls may not be used. Instead, spring terminals can be molded into the housing 110 to allow for a mechanical connection, or alternatively, in some embodiments, gold ball bonds may be used to raise the electrical pads above the flush surface of the sense die 120. The sense die 120 may typically be tightly controlled dimensionally (e.g. ±13 µm). This method of electrical connection may eliminate the need for wire bonds and may allow a mechanical connection between the sense die 120 and the housing 110 to serve as an electrical connection. In some embodiments, the sense die 120 may be SMT (surface mount technology) mounted to the housing 110, for example, with the use of solder balls.

In the exemplary embodiment of FIG. 1, the actuation element 150 is a spherical ball bearing. The spherical ball bearing is shown to be configured to fit within an aperture 111 located in the top wall 112 of the housing 110. However, in some embodiments, the actuation element 150 may vary and may include a pin, an extender, a button, any other activation device, and/or a combination thereof. Depending on the type of actuation element 150 used, the aperture/opening 111 may be sized to allow the actuation element 150 to be snap fitted into position. In some embodiments, the aperture 111 may comprise a retention feature. The retention feature may have two different sized diameters. Typically, one diameter may be smaller than the other diameter. The larger diameter of the aperture 111 may be located towards the interior 112a of the top wall 112 of the housing 110, and the smaller diameter of the aperture 111 may be located towards the exterior 112b of the top wall 112 of the housing 110. In this manner, the insertion of the actuation element 150 through the aperture 111 of the top wall 112 of the housing 110 may allow the actuation element 150 to snap fit into place between the housing 110 and the sense die 120 during use.

It should be appreciated that other types of actuation elements 150 may be utilized, such as, for example, slidable mounted plungers or shafts, point of contact type components other than spherical objects, and/or "T"-shaped transfer mechanisms, in accordance with alternative embodiments. If desired, only a portion of an outer surface of the actuation element 150 may be spherical in shape or take on a particular shape. The actuation element 150 may be made of any material. For example, the actuation element 150 may be formed from stainless steel, a polymer, a ceramic, jeweled, another suitable metal, and/or another suitable material. In some cases, the actuation element 150 may include a stainless steel ball bearing. It is contemplated, however, that other generally spherical and other shaped elements may be used as or as part of the actuation element 150, if desired, including polymer based objects.

In the exemplary embodiment of FIG. 1, a plug 130 may be inserted within the cavity/opening 116 of the housing 110 after the sense die 120 has been inserted. The plug 130 may act as an environmental protectant (e.g. prevent dust, debris, etc. from entering the force sensor assembly 100). Typically, the plug 130 may contact the sense die 120 and hold it in place within the housing 110. The material used for the plug 130 may vary and may include plastic, rubber, and/or any other material capable of snugly fitting within the cavity 116.

Figure 2:
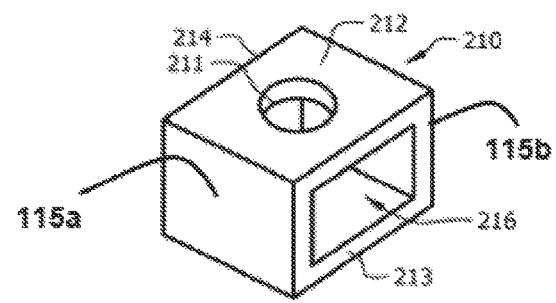
FIG. 2 illustrates a perspective view of the universal housing comprising a top wall having an aperture, two sidewalls, a bottom wall, and a back wall.

FIG. 2 illustrates a perspective view of the housing 210. The housing 210 may typically comprise a rectangular prism/cuboid shape and may comprise up to five faces. In the exemplary embodiment of FIG. 2, the housing 210 comprises a top wall 212, two sidewalls 115a, 115b, a bottom wall 213, and a back wall 214. Typically, the two sidewalls 115a, 115b may support the top wall 212 and the bottom wall 213 and may form a cavity 216 to allow insertion of the sense die. In most cases, the cavity 216 may be rectangular/square to match the shape of the sense die. Thus, the sense die may be snugly fit within the cavity 216 of the housing 210.

The exemplary embodiment of FIG. 2 further comprises an aperture 211 located in the top wall 212 of the housing 210. The aperture 211 is shown to be centrally located and may typically be large enough to snugly fit the actuation element. Typically, the aperture 211 may comprise a retention feature having two different sized diameters (as described in reference to FIG. 1) allowing the actuation element to snap fit into place between the housing 210 and the sense die.

In some embodiments, the actuation element may be comprised within the housing. Thus, during formation of the housing (via injection molding), the actuation element may be formed where the aperture 211 is shown in FIG. 2. In this case, the housing 210 and/or the actuation element may be formed of a material having some degree of flexibility such as a polymer. The actuation element may typically interface with the center of the sense die so that the actuation element may transmit a uniaxial force normal to the plane of the sense die. In this manner, typically, the one or more sense elements (e.g. piezoresistive elements) having an electrical resistance that varies depending on the amount of mechanical stress applied may detect a change in force, such as a pressure, as the actuation element contacts the plane of the sense die.

In some embodiments, the location of the actuation element may vary. As shown in the exemplary embodiment of FIG. 1, the actuation element 150 may be located within the top wall 112 of the housing 110. However, depending upon the location/orientation of the sense die 120 in relation to the one or more sense elements, the location of the actuation element 150 may vary. In some cases, the actuation element 150 may be located within one of the side walls, the back wall 114, and/or the bottom wall 113.

Figures 3A, 3B, 3C:
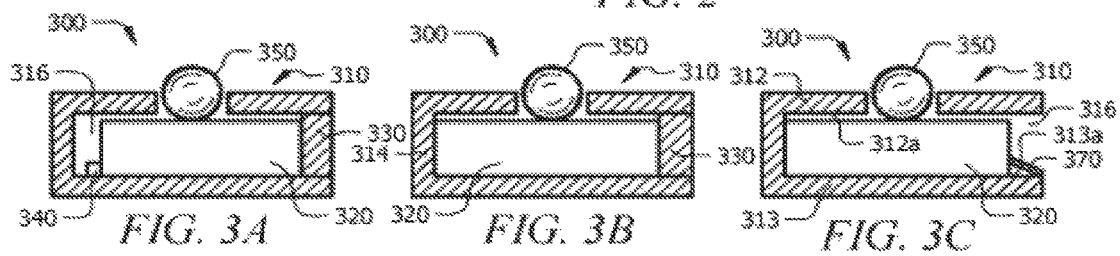
FIG. 3A illustrates a side, cross-sectional view of an exemplary force sensor assembly comprising a housing, a sense die, an actuation element, a plug, and a die stop.
FIG. 3B illustrates a side, cross-sectional view of an exemplary force sensor assembly comprising a housing, a sense die, an actuation element, and a plug.
FIG. 3C illustrates a side, cross-sectional view of an exemplary force sensor assembly comprising a housing, a sense die, an actuation element, a plug, and a retractable support member.

FIG. 3A-FIG. 3C illustrate a side, cross-sectional view of an exemplary force sensor assembly 300 having different means of retaining the sense die 320 within the cavity 316 of the housing 310.

In the exemplary embodiment of FIG. 3A, the force sensor assembly 300 comprises a housing 310, a sense die 320, an actuation element 350, a plug 330, and a die stop 340. Typically, the die stop 340 may be a protruded portion of the housing 310. The die stop 340 may provide for positioning of the sense die 320 within the cavity 316 of the housing 310 and may allow proper configuration of the actuation element 350 on the top surface of the sense die 320. Generally, the die stop 340 may vary in shape and size as long as the die stop 340 achieves its function of holding the sense die 320 in place.

In the exemplary embodiment of FIG. 3B, the force sensor assembly 300 comprises a housing 310, a sense die 320, an actuation element 350, and a plug 330. In this embodiment, the back wall 314 of the housing 310 acts as the die stop feature for the sense die 320. Typically, the size of the housing 310 may be formed such that the sense die 320 may fit snugly within the housing 310. Additionally, the size of the housing 310 may be configured to allow proper configuration of the actuation element 350 over the top surface of the sense die 320. Generally, the lack of the die stop feature (as shown in FIG. 3A) may allow for smaller packaging of the force sensor assembly 300. This may serve as an advantage for several nano-force applications.

The exemplary embodiment of a force sensor assembly 300 shown in FIG. 3C comprises a housing 310, a sense die 320, an actuation element 350, and a retractable support member 370. In the exemplary embodiment of FIG. 3C, the plug is shown to be replaced with a retractable support member 370. Typically, the retractable support member 370 may be configured to retract towards the interior 313a of the bottom wall 313 during insertion of the sense die 320 into the cavity 316 of the housing 310. Once the sense die 320 is inserted into the housing 310, the retractable support member 370 may snap back up (e.g. away from the interior 313a of the bottom wall 313). In this manner, the retractable support member 370 may hold the sense die 320 in place within the housing 310.

In some embodiments, the retractable support member 370 may be located on the interior 312a of the top wall 312, one or more of the side walls, the bottom wall 313, and/or combinations thereof. In some embodiments, the retractable support member 370 may be configured to retract/snap into a portion of the sense die 320 configured to accept the retractable support member 370.

Figures 4A, 4B:
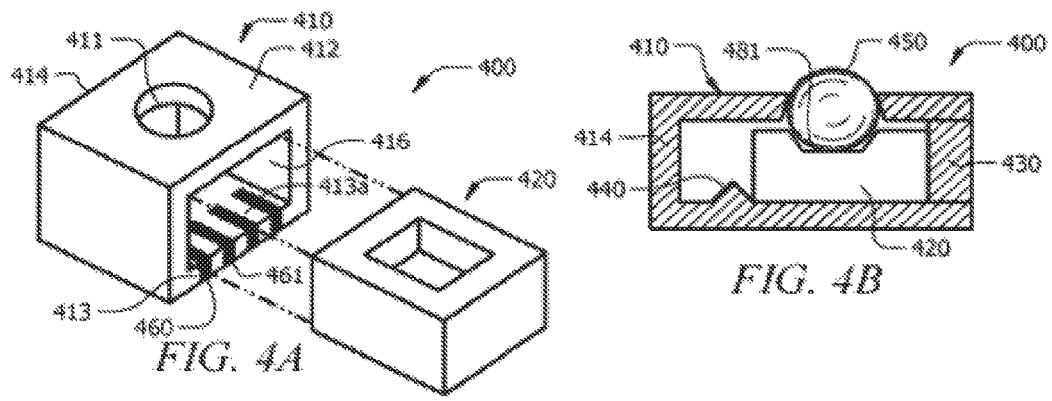
FIG. 4A illustrates a perspective view of an exemplary force sensor assembly comprising a housing, electrical connections, and a sense die.
FIG. 4B illustrates a cross-sectional view of an exemplary force sensor assembly comprising a housing, an actuation element, a die stop, a plug, and a sense die.

FIG. 4A illustrates a perspective view of an exemplary force sensor assembly comprising a housing 410, electrical connections 460, and a sense die 420. In the exemplary embodiment of FIG. 4A, the sense die 420 slides into the cavity 416 of the housing 410 and mates with the electrical traces 461 located on the interior 413a of the bottom wall 413 of the housing 410. Typically, electrical traces 461 may wrap around to the exterior of the bottom wall 413 of the housing 410, and, in some embodiments, the electrical traces 461 may wrap around to the exterior of the back wall 414. In this configuration, the sense die may be SMT mounted to the housing (for example, with the use of solder balls and reflow. Generally, the electrical traces 461 located on the interior 413a of the bottom wall 413 of the housing 410 may comprise four terminal pads as shown in FIG. 4A. The electrical traces 461 wrapping around the side and exterior of the bottom wall 413 of the housing 410 may be customizable depending on the Customer's application. Additionally, the optional electrical traces 461 located on the exterior of the back wall may be customizable depending on the Customer's application.

In some embodiments, the electrical traces 461 shown in FIG. 4A may comprise different orientations/locations. For example, the electrical traces 461 may enter the interior of the housing 410 from different sides. In some embodiments, the electrical traces 461 may enter the interior of the housing 410 from the back wall 414 of the housing 410. In some embodiments, the electrical traces 461 may enter the interior of the housing 410 from the side walls of the housing 410. In some embodiments, the electrical traces 461 may enter the interior of the housing 410 from a combination of ways described above. Generally, the electrical traces 461 located on the interior of the housing 410 may mate with the die pads on the sense die 420.

In the exemplary embodiment of FIG. 4A, the sense die 420 is a gauge sense die. Typically, a gauge sense die 420 may not require a plug to seal the sense die 420 within the housing 410. Generally, gauge sense dies 420 may require a vent, so the cavity 416 of the housing 410 may serve as the vent for the gauge sense die 420. Additionally, in some embodiments, the aperture 411 located on the top wall 412 of the housing 410 containing the actuation element may serve as the vent. Typically, the exemplary embodiment of FIG. 4A may comprise a retractable support member as shown in FIG. 3C so as to allow the gauge sense die 420 to vent to the ambient/surrounding environment. In some embodiments, the sense die 420 may be a slab die. In this case, the sense die 420 may need to be protected from environmental contaminants, so a plug may be used in the force sensor assembly 400 rather than a retractable support member.

FIG. 4B illustrates a cross-sectional view of an exemplary force sensor assembly 400 comprising a housing 410, an actuation element 450, a die stop 440, a plug 430, and a gauge sense die 420. Typically, the gauge sense die 420 may comprise a cavity 481 at the center where the actuation element 450 may interface with the gauge sense die 420. In the embodiment of FIG. 4B, the actuation element 450 is shown to be held in place by a retention feature having two different sized diameters (as described in reference to FIG. 1) and the cavity 481 at the center of the gauge sense die 420.

In the exemplary embodiment of FIG. 4B, the die stop 440 and the plug 430 may be optional features. In some cases, the back wall 414 of the housing 410 may serve as the die stop for the sense die 420. Additionally, the plug 430 may not be required (especially with a gauge sense die 420). Instead, a retractable support member may be used to ensure the sense die 420 does not slip out of the housing 410. Persons of skill should appreciate other methods of holding the sense die 420 in place within the housing assembly 410.

Figure 5A:
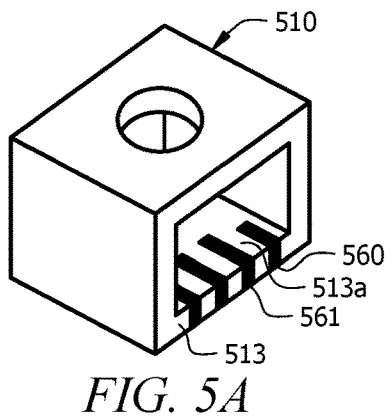
FIG. 5A illustrates a perspective view of an exemplary housing comprising one or more electrical connections.
Figure 5B:
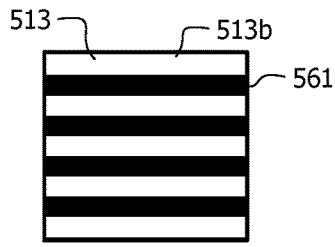
FIG. 5B illustrates an exterior view of the bottom wall of the housing comprising one or more electrical connections.

FIG. 5A-FIG. 5B illustrate an exemplary embodiment of a housing 510 for a force sensor comprising one or more electrical connections 560 formed by laser selective plating. Laser selective plating is a conventionally known technique which may involve integrating antenna circuits and/or electrical traces 561 directly with a plastic (e.g. thermos plastic) part's mechanical structure. Typically, this may occur during the molding process of manufacturing the mechanical structure.

In the exemplary embodiment of FIG. 5A, the electrical traces 561 are shown to be located on the interior 513a of the bottom wall 513 and the edges (e.g. near/adjacent the cavity of the housing) of the bottom wall 513 of the housing 510. Typically, the electrical traces 561 shown to be located on the interior 513a of the bottom wall 513 may be formed in a standard/universal pattern to fit the Customer's needs. Thus, the common assembly of the housing 510 may be universally used with a sense die without any requirements for re-designing based on design requirement of the application area.

Figure 5C:
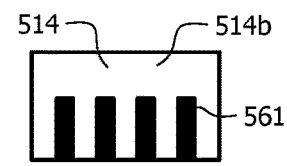
FIG. 5C illustrates an exterior view of the back wall of the housing comprising one or more electrical connections configured for edge connection.

The exemplary embodiment of FIG. 5B and FIG. 5C illustrate the electrical traces 561 located on the exterior 513b of the bottom wall 513 and the exterior 514b of the back wall 514. Typically, as shown in the exemplary embodiment of FIG. 5B, the electrical traces 561 located on the exterior 513b of the bottom wall 513 may be customizable to fit the Customer's application. Additionally, as shown in the exemplary embodiment of FIG. 5C, the electrical traces 561 located on the exterior 514b of the back wall 514 may be optional (e.g. depends on the Customer's needs) and may allow for edge connection of the sense die 510. In some embodiments, the exterior 514b of the back wall 514 may not comprise electrical traces 561.

Figure 6:
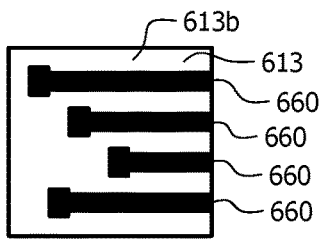
FIG. 6 illustrates an alternative, exterior view of the bottom wall of the housing comprising one or more electrical connections.

FIG. 6 illustrates an exemplary exterior 613b of the bottom wall 613 of the housing of a force sensor. Typically, the embodiment shown in FIG. 6 may allow for SMT mounting of the sense die to the housing. In other words, additional customization of the housing may not be required, and the electrical connections 660 (e.g. electrical traces) may not need to wrap around to the exterior 613b of the back wall 613. In the exemplary embodiment of FIG. 6, the electrical connections 660 terminate at the exterior of the bottom wall of the housing. In this manner, the electrical connections 660 formed by laser selective plating may allow connection from the interior of the housing (e.g. from the sense die) to the exterior of the housing (e.g. processing circuitry a microprocessor, a microcontroller, an application specific integrated circuit ("ASIC"), and/or an application specific standard product ("ASSP")).

In the exemplary embodiments of FIG. 5A-FIG. 6, there are four electrical connections 560, 660 shown across the bottom wall 513, 613 of the housing. However, in some embodiments, the number and location of the electrical connections 560, 660 may vary. For example, there may be two electrical connections 560, 660 entering from one side of the bottom wall 513, 613 and two electrical connections 560, 660 entering from the opposite side of the bottom wall 513, 613. In some embodiments, the electrical connections 560, 660 may be located on the top wall, at least one of the side walls, the back wall, the bottom wall, or combinations thereof. In some embodiments, the electrical connections 560, 660 may be located on at least one of the sidewalls as insert molded metal studs. Typically, electrical connections 560, 660 may be formed by at least one of the following: laser selective plating of the electrical traces, creating metal traces and over molding the traces onto the housing, using insert molded metal studs, using insert metal terminals (which bend from the bottom to the top and may compress under the sense die (like a spring) and provide an electrical connection by retracting/pressing against the bond pad(s) of the sense die), another form of electrical connection, or combinations thereof.

FIG. 7A-FIG. 7D illustrate an exemplary embodiment of a housing 710 of a force sensor comprising electrical connections 760 formed from insert molded metal studs 762 and/or laser selective plating 761.

Figure 7A:
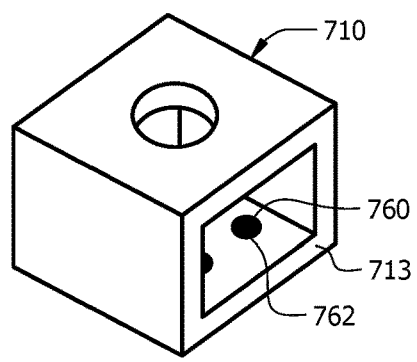
FIG. 7A illustrates an alternative, perspective view of an exemplary housing comprising one or more electrical connections.

In the exemplary embodiment of FIG. 7A, the housing comprises at least one or more electrical connections 760 located on the bottom wall 713. The electrical connections 760 shown in the exemplary embodiment of FIG. 7A comprise insert molded metal studs 762. Generally, insert molded metal studs 762 may penetrate through the bottom wall 713 of the housing allowing electrical connection from the sense die to external circuitry. Additionally, insert molded metal studs 762 may be inserted into the housing 710 after the housing 710 is formed (for example, from injection molding).

Figure 7B:
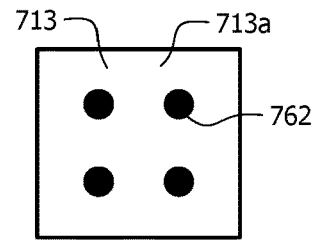
FIG. 7B illustrates an interior view of the bottom wall of the housing comprising one or more electrical connections formed from insert molded metal studs.
Figure 7C:
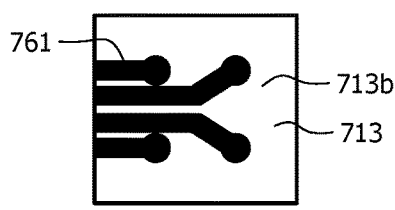
FIG. 7C illustrates an exterior view of the bottom wall of the housing comprising one or more electrical connections formed from insert molded metal studs and laser selective plating.
Figure 7D:
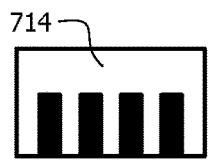
FIG. 7D illustrates an exterior view of the back wall of the housing comprising one or more electrical connections configured for edge connection (similar to the exemplary embodiment shown in FIG. 5C).

The exemplary embodiments of FIG. 7B and FIG. 7C illustrate the interior 713a of the bottom wall 713 of the housing 710 and the exterior 713b of the bottom wall 713 of the housing 710, respectively. In the exemplary embodiment of FIG. 7B, there are four insert molded metal studs 762 placed equally apart on the interior 713a of the bottom wall 713 of the housing 710. In some embodiments, the number and pattern of the insert molded metal studs 762 may vary depending on the application. Additionally, with the insertion of the insert molded metal studs 762, the force sensor assembly may be customizable using laser selective plating to form electrical traces 761 as shown in the exemplary embodiment of FIG. 7C. Generally, laser selective plating may provide a surface result/effect. Thus, laser selective plating may be appropriate to use on the exterior of the housing 710 once the housing 710 is manufactured. In some embodiments, depending on the Customer's application, the laser selective plating may be applied to the back wall 714 of the housing 710 as shown in FIG. 7D. This may provide the Customer with the option of edge connection of the force sensor assembly.

Having described device embodiments above, especially with regard to the figures, various additional embodiments can include, but are not limited to the following:

In a first embodiment, a universal housing for holding a sense die comprising: an actuation element; a top wall; a bottom wall comprising one or more electrical connections; and two sidewalls configured to hold the top wall and the bottom wall, wherein the top wall, the bottom wall, and the two sidewalls form a cavity configured to receive a sense die and hold the sense die in place with respect to the actuation element. A second embodiment can include the universal housing of the first embodiment, wherein the top wall comprises an aperture configured to hold the actuation element to actuate the sense die based on a force realized by the actuation element and transferred to the sense die positioned within the housing. A third embodiment can include the universal housing of the first to second embodiments, wherein the actuation element is comprised within the housing, and wherein the actuation element is operable to receive a force and transfer the force to the sense die positioned within the housing. A fourth embodiment can include the universal housing of the first to third embodiments, further comprising a back wall configured to hold the sense die within the housing and prevent environmental contamination to the sense die. A fifth embodiment can include the universal housing of the first to fourth embodiments, further comprising a die stop configured to hold the sense die at a desired position within the housing (e.g. stop the sliding of the sense die), and wherein the die stop is located on the interior face of at least one of the following: the bottom wall, the interior face of the top wall, the interior face of at least one of the sidewalls, or combinations thereof. A sixth embodiment can include the universal housing of the first to fifth embodiments, wherein upon sliding the sense die inside the cavity, a plug is inserted inside the cavity to prevent the sense die from retracting back outside the housing. A seventh embodiment can include the universal housing of the first to sixth embodiments, wherein the plug is configured to fit snugly inside the cavity between the two sidewalls, the top wall, and the bottom wall of the housing. An eighth embodiment can include the universal housing of the first to seventh embodiments, wherein upon sliding the sense die inside the cavity, the electrical connections on the interior of the bottom wall of the housing mate with one or more bond pads of the sense die. A ninth embodiment can include the universal housing of the first to eighth embodiments, wherein the electrical connections are configured to be SMT mountable or solderable. A tenth embodiment can include the universal housing of the first to ninth embodiments, wherein the electrical connections comprise at least one of the following: electrical traces formed by laser selective plating, molded metallic studs, or combinations thereof. An eleventh embodiment can include the universal housing of the first to tenth embodiments, wherein the electrical connections on the bottom face of the housing receive signals corresponding to the amount of force transmitted by the actuation element and sensed by the sense die. A twelfth embodiment can include the universal housing of the first to eleventh embodiments, wherein the electrical traces formed by laser selective plating provide customized placement of the universal housing over a printed circuit board (PCB) depending on the design requirements of the PCB. A thirteenth embodiment can include the universal housing of the first to twelfth embodiments, wherein the actuation element is a ball bearing. A fourteenth embodiment can include the universal housing of the first to thirteenth embodiments, wherein the aperture comprises two diameters configured to provide a retention fit for the actuation element, wherein the first diameter is smaller than the second diameter, wherein the first diameter is located on the exterior of the top wall of the housing, and wherein the second diameter is located on the interior of the top wall of the housing.

Exemplary embodiments might also relate to a method for assembling a universal housing (e.g. similar to those described above, which may be considered optionally incorporated herein with respect to the discussion of the system). Such method embodiments, for example, might include, but are not limited to, the following:

In a fifteenth embodiment, a method for assembling a universal housing, the method comprising: forming a housing; forming electrical connections; wherein: the housing comprises a top wall, a back wall, a bottom wall, two side walls, and a cavity; the cavity of the housing is configured for insertion of a sense die; and the electrical connections are located on a bottom wall of the housing. A sixteenth embodiment can include the method of the fifteenth embodiment, wherein the housing is formed by injection molding. A seventeenth embodiment can include the method of the fifteenth to sixteenth embodiments, further comprising an actuation element, wherein the actuation element is operable to receive a force and transfer the force to the sense die positioned within the housing. An eighteenth embodiment can include the method of the fifteenth to seventeenth embodiments, further comprising an aperture located in the top wall of the housing, wherein the aperture is configured for interaction with an actuation element. A nineteenth embodiment can include the method of the fifteenth to eighteenth embodiments, wherein the electrical connections comprise at least one of the following: laser selective plating of the electrical traces, creating metal traces and over molding the traces onto the housing, using insert molded metal studs, or combinations thereof. A twentieth embodiment can include the method of the fifteenth to nineteenth embodiments, wherein the sense die comprises a gage die or a slab die. A twenty-first embodiment can include the method of the fifteenth to nineteenth embodiments, further comprising a plug configured to fit snugly inside the cavity to prevent the sense die from retracting back outside the housing. A twenty-second embodiment can include the method of the fifteenth to twenty-first embodiments, further comprising a die stop configured to hold the sense die at a desired position within the housing (e.g. stop the sliding of the sense die).

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification, and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system, or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A sensor, comprising:
an actuation element;
a sense die; and
a housing comprising a top wall and a bottom wall, wherein the top wall and the bottom wall define a cavity therebetween,
wherein the top wall defines an aperture extending therethrough, the aperture having a first central axis,
wherein the housing defines an opening between the top wall and the bottom wall extending from an exterior of the housing to the cavity,
wherein the opening has a second central axis and is configured to receive the sense die therethrough, and
wherein at least a portion of the actuation element extends from the cavity through the aperture, and wherein the first central axis of the aperture is orthogonal to the second central axis of the opening.

2. The sensor of claim 1, wherein the actuation element is disposed within the housing, and wherein the actuation element is operable to receive a force and transfer the force to the sense die.

3. The sensor of claim 1, wherein a plug is disposed within the opening, wherein the plug is configured to retain the sense die within the housing.

4. The sensor of claim 1, further comprising a plurality of electrical connections disposed on an interior surface of one or more of plurality of walls, wherein the plurality of electrical connections comprise at least one of electrical traces formed by laser selective plating, molded metallic studs, or combinations thereof.

5. The sensor of claim 4, wherein the sense die is electrically coupled to the plurality of electrical connections using SMT mounting or soldered connections.

6. A housing for holding a sense die, comprising:
a top wall, wherein the top wall defines an aperture extending therethrough, and wherein the aperture having a first central axis;
a bottom wall comprising one or more electrical connections; and
two sidewalls configured to hold the top wall and the bottom wall, wherein the top wall, the bottom wall, and the two sidewalls form a cavity wherein an opening is defined between the top wall and the bottom wall extending from an exterior of the housing to the cavity, wherein the opening has a second central axis and is configured to receive the sense die therethrough, and
wherein the first central axis of the aperture is orthogonal to the second central axis of the opening.

7. The housing of claim 6, wherein the aperture is configured to hold an actuation element, wherein the actuation element is configured to actuate the sense die based on a force realized by the actuation element and transferred to the sense die.

8. The housing of claim 6, further comprising a back wall configured to hold the sense die within the housing and prevent environmental contamination to the sense die.

9. The housing of claim 6, further comprising a die stop configured to hold the sense die at a desired position within the housing, and wherein the die stop is located on an interior face of at least one of the bottom wall, an interior face of the top wall, an interior face of the at least one of the two sidewalls, or combinations thereof.

10. The housing of claim 6, further comprising a plug, wherein the plug is configured to fit snugly inside the cavity between the at least one of the two sidewalls, the top wall, and the bottom wall of the housing.

11. The housing of claim 6, wherein the one or more electrical connections electrically mate with one or more bond pads of the sense die.

12. The housing of claim 6, wherein the one or more electrical connections are configured to receive signals corresponding to an amount of force transmitted by an actuation element and sensed by the sense die.

13. A method of assembling a sensor housing, the method comprising:
  forming a housing, wherein the housing comprising a top wall, and a bottom wall defining a cavity therebetween,
  wherein the top wall defining an aperture extending therethrough, the aperture having a first central axis,
  wherein the housing defining an opening between the top wall and the bottom wall extending from an exterior of the housing to the cavity, and wherein the opening has a second central axis and is configured to receive a sense die therethrough; and
  forming electrical connections;
  wherein:
  the electrical connections are located on a bottom of the housing, and
  the first central axis of the aperture is orthogonal to the second central axis of the opening.

14. The method of claim 13, wherein the housing is formed by injection molding.

15. The method of claim 13, further comprising an actuation element, wherein the actuation element is operable to receive a force and transfer the force to the sense die positioned within the housing.

16. The method of claim 13, wherein the aperture is configured for interaction with an actuation element.

17. The method of claim 13, wherein the electrical connections comprise at least one of laser selective plating of electrical traces, creating metal traces and over molding the metal traces onto the housing, using insert molded metal studs, or combinations thereof.

18. The method of claim 13, wherein the sense die comprises a diaphragm based die or a slab die.

19. The method of claim 13, further comprising a plug configured to fit snugly inside the cavity to prevent the sense die from retracting back outside the housing.

20. The method of claim 13, further comprising a die stop configured to hold the sense die at a desired position within the housing.

\* \* \* \* \*